United States Patent [19]

Heap et al.

[11] Patent Number: 4,851,201
[45] Date of Patent: Jul. 25, 1989

[54] METHODS OF REMOVING $NO_x$ AND $SO_x$ EMISSIONS FROM COMBUSTION SYSTEMS USING NITROGENOUS COMPOUNDS

[75] Inventors: Michael P. Heap, Corona Del Mar; Shih L. Chen, Irvine; James M. McCarthy, Laguna Beach, all of Calif.; David W. Pershing, Salt Lake City, Utah

[73] Assignee: Energy and Environmental Research Corporation, Irvine, Calif.

[21] Appl. No.: 73,980

[22] Filed: Jul. 15, 1987

Related U.S. Application Data

[63] Continuation-in-part of Ser. No. 39,324, Apr. 16, 1987.

[51] Int. Cl.[4] .................. C01B 21/00; C01B 17/00; B01J 8/00
[52] U.S. Cl. .................. 423/235; 423/239; 423/244
[58] Field of Search .................. 423/235, 235 D, 236, 423/244 R, 244 A, 239, 239 A

[56] References Cited

U.S. PATENT DOCUMENTS

| | | |
|---|---|---|
| 3,382,822 | 5/1968 | Bienstock et al. .................. 110/28 |
| 3,746,498 | 7/1973 | Stengel .................. 423/235 |
| 3,900,554 | 8/1975 | Lyon .................. 423/235 |
| 4,041,699 | 8/1977 | Schelp .................. 60/39.55 |
| 4,080,425 | 3/1978 | Tanaka et al. .................. 423/236 |
| 4,208,386 | 6/1980 | Arand et al. .................. 423/235 |
| 4,325,924 | 4/1982 | Arand et al. .................. 423/235 |
| 4,335,084 | 6/1982 | Brogan .................. 423/235 |
| 4,350,669 | 9/1982 | Izumi et al. .................. 423/235 |
| 4,368,057 | 1/1983 | Matthews .................. 48/197 |
| 4,395,223 | 7/1983 | Okigami et al. .................. 431/10 |
| 4,585,632 | 4/1986 | Schneider et al. .................. 423/239 |
| 4,645,652 | 2/1987 | Kimura .................. 423/235 |
| 4,719,092 | 1/1988 | Bowers .................. 423/235 |
| 4,731,233 | 3/1988 | Thompson et al. .................. 423/244 |

FOREIGN PATENT DOCUMENTS

| | | |
|---|---|---|
| 2719417 | 2/1978 | Fed. Rep. of Germany . |
| 53-128023 | 11/1978 | Japan .................. 423/235 |
| 54-28771 | 3/1979 | Japan .................. 423/235 |
| 1572118 | 7/1980 | United Kingdom . |

OTHER PUBLICATIONS

R. A. Perry et al., "Rapid Reduction of Nitrogen Oxides in Exhaust Gas Streams", Nature, vol. 324, 18/25, pp. 657–658.

(List continued on next page.)

Primary Examiner—Gregory A. Heller
Attorney, Agent, or Firm—Workman, Nydegger & Jensen

[57] ABSTRACT

The present invention relates to methods for selectively reducing $NO_x$ so that nitrogen can be removed from emission effluent streams and $NO_x$ emissions can be reduced to very low levels. In addition, the present invention teaches a method whereby $NO_x$ and $SO_x$ may be simultaneously removed from the effluent stream.

The present invention teaches the reduction of $NO_x$ with —NH and —CN containing selective reducing agents such as ammonium sulfate, urea, and $NH_3$. Initially, the selective reducing agent is decomposed in a fuel-rich environment to form highly reactive decomposition products. The reaction of the selective reducing agent to produce its decomposition products, such as NH, $NH_2$, and related reaction intermediates, takes place in an oxygen-free, fuel-rich decomposition zone with the reaction temperature in the range of from about 300° F. to about 2400° F.

After the selective reducing agent is decomposed in the absence of oxygen, the decomposition products are contacted with the effluent stream containing $NO_x$. At this point the oxygen level of the stream must be carefully controlled to provide an excess of oxygen so that the selective reduction of the $NO_x$ species will occur. It may be necessary at this point to inject air into the effluent stream in order to maintain the proper oxygen-rich (fuel-lean) conditions for $NO_x$ reduction. In this second "reaction zone", $NO_x$ reduction takes place at temperatures of from approximately 500° F. to approximately 2600° F.

The present invention can also be used in conjunction with $SO_x$ control technology. Specifically, species used to control $SO_x$, such as limestone, dolomite, quicklime, and hydrated lime, can be added in conjunction with the selective reducing agent for simultaneous $NO_x$ and $SO_x$ control.

45 Claims, 3 Drawing Sheets

OTHER PUBLICATIONS

T. Yano et al., "Behavior of Methanol and Formaldehyde in Burned Gas from Methanol Combustion, Effects of Nitric Oxide on Oxidation Reaction", Bulletin of the SME, vol. 26, No. 213, pp. 406–413 (Mar. 1983).
Abstract No. 34164B/18, Toray Industries, Inc., Mar. 22, 1979.
Abstract No. 19017Y/11, Nippon Steel Chem KK, Mar. 2, 1977.
Abstract No. 35069Y/20, Toray Industries KK, Apr. 2, 1977.
Abstract No. 57829A/32, Mitsubishi Heavy Ind. KK, Jul. 7, 1978.
English translation of Japanese Patent Application No. 090185, filed Jul. 25, 1975, published Feb. 3, 1977 and previously cited as Abstract No. 19017Y/11.
English translation of Japanese Patent Application No. 112559, filed Sep. 19, 1975, published Apr. 2, 1977 and previously cited as Abstract No. 35069Y/20.
English translation of Japanese Patent Application No. 152847, filed Dec. 21, 1976, published Jul. 7, 1976 and previously cited as Abstract No. 57829A/32.
English translation of Japanese Patent Application No. 104767, filed Sep. 2, 1977, published Mar. 22, 1979 and previously cited as Abstract No. 34164B/18.

METHODS OF REMOVING NO$_x$ AND SO$_x$ EMISSIONS FROM COMBUSTION SYSTEMS USING NITROGENOUS COMPOUNDS

BACKGROUND

1. The Field of the Invention

The present invention is related to methods for reducing nitrogen oxide ("NO$_x$") emissions from pollution sources, such as combustion systems. More particularly, the present invention relates to the noncatalytic, selective reduction of NO$_x$ by —NH and —CN containing compounds to achieve very low levels of NO$_x$ emissions.

2. Related Applications

This application is a continuation-in-part application of copending application Ser. No. 06/039,324, filed Apr. 16, 1987, entitled "METHODS OF REDUCING NO$_x$ AND SO$_x$ EMISSIONS FROM COMBUSTION SYSTEMS" invented by Michael P. Heap, Shih L. Chen, James M. McCarthy, and David W. Pershing. That application is incorporated herein by this reference.

3. The Background of the Invention

One of the major problems in industrialized society is the production of air pollution from numerous sources. Air pollution can take various forms. Some of the different types of air pollutants include particulate emissions such as coal ash, partially burned coal particles, and the like, sulfur compounds such as SO$_2$ and SO$_3$ (sometimes collectively referred to as "SO$_x$"), ozone, carbon oxide emissions, volatile hydrocarbon emissions, and emissions of nitrogen oxides (commonly referred to collectively as "NO$_x$"). Pollution sources include automobiles, industrial plants, small commercial establishments, such as dry cleaners and service stations, and even nature itself.

Combustion effluents and waste products from particular types of sources have proven to be major contributors to damaging air pollution when the effluents are discharged into the atmosphere. Unless these waste products are treated before their release into the atmosphere, serious smog and air pollution problems are encountered.

It will be appreciated that high concentrations of air pollutants have serious deleterious impacts on the health and general welfare of society. Air pollution is known to aggravate certain medical conditions (such as heart and lung problems) and is known to cause problems in the environment, ranging from corrosion to acid rain.

One of the most common components found in polluted air is nitrogen dioxide ("NO$_2$") which is known to be toxic. Nitrogen dioxide, which is brown in color, undergoes a series of reactions, known generally as "photochemical smog formation," in the presence of sunlight and airborne hydrocarbons. These reactions result in a marked decline in overall air quality.

While NO$_2$ is produced from a wide variety of pollution sources, its primary source is from nitric oxide ("NO") released into the air. NO is commonly formed during combustion processes, including internal combustion engines in automobiles, hydrocarbon fuel power plants, process furnaces, incinerators, coal fired utility boilers, glass furnaces, cement kilns, oil field steam generators, gas turbines, and other similar installations.

There are two primary mechanisms for the formation of nitrogen oxides in the combustion processes. Within the high temperature portions of flame, atmospheric oxygen can react with molecular nitrogen ("N$_2$") to form NO by the high temperature "thermal fixation" mechanism.

In addition, fuels which contain large amounts of nitrogen chemically bound within the fuel structure may produce significant NO$_x$ emissions as a result of the oxidation of the fuel nitrogen during the burning process. This source of NO$_x$ emission (often termed "fuel NO$_x$") is the predominant source of NO$_x$ with the combustion of coal, heavy oils, biological and agricultural residues, and some municipal, industrial, and agricultural wastes.

Since NO is the only oxide of nitrogen which is stable at the high temperatures encountered in these types of combustion processes, NO is the predominant nitrogen emission product. At normal atmospheric temperatures, however, the equilibrium between NO and NO$_2$ favors NO$_2$. Hence, NO formed by combustion is generally discharged into the atmosphere as NO, and only subsequently converted to NO$_2$. In order to control NO$_2$ emissions, therefore, it is necessary to eliminate NO before it enters the atmosphere.

There have been considerable efforts in the art to find effective ways to remove oxides of nitrogen from waste gases so that these waste gases may be discharged to the atmosphere without harm to the environment.

Because the "thermal fixation" of atmospheric nitrogen is exclusively a high temperature phenomenon, occurring above 2800° F., it has been possible to achieve significant reductions in NO$_x$ emissions from the combustion of nitrogen-free fuels (such as natural gas or gasoline) by reducing the overall temperature in the combustion zone. This is accomplished using techniques such as exhaust gas recirculation in automobiles or flue gas recirculation in utility boilers.

Fuel NO$_x$ formation is most easily controlled by limiting the amount of oxygen present during the period in which the nitrogen species are being evolved from the fuel matrix. Techniques such as a staged combustion, overfire air addition, and "burners out of service" all use this concept to limit fuel and nitrogen oxidation.

More recently, it has been recognized that limited amounts of hydrocarbon fuels, particularly those which do not contain fuel nitrogen, can be used to effectively incinerate NO formed in the main combustion zone by creating a fuel rich (oxygen deficient) environment downstream of the primary combustion zone. This technique is generically termed "reburning," and like the other combustion modification techniques, is capable of producing overall NO$_x$ reductions in excess of 50% under optimized conditions.

Unfortunately, at the present time, none of the combustion modification techniques are capable of producing very high levels of NO$_x$ control in the range of approximately 80% to 90%. To achieve extremely low NO$_x$ emission levels, it is necessary to utilize some type of downstream, effluent gas cleanup system.

It has been found in the art that removal of NO$_2$ from a combustion effluent stream is relatively easy since it reacts with water and air to form nitric acid. NO$_2$, therefore, is commonly removed by aqueous scrubbing. If a base, such as ammonia, is added to the scrub water, the nitrogen scrubbing process is facilitated and ammonium nitrate is produced. If limited amounts of NO are present along with the NO$_2$, the NO may be coscrubbed, thereby yielding ammonium nitrate.

Most chemical scrubbing techniques are subject to the limitation that they are only effective for mixture of nitrogen oxides which are predominantly $NO_2$, rather than predominantly NO. This presents a problem because NO is the predominant species at the high temperature generally encountered in flue gases. As a result, various processes have been developed in the art for oxidizing NO to $NO_2$ so that the relatively inexpensive and convenient scrubbing processes may take place.

Several processes known in the prior art involve contacting the gaseous flow which includes NO, with various organic compounds (such as aldehydes, alcohols, ketones, organic acids, and the like) in the presence of oxygen. By such processes, the NO is oxidized to $NO_2$ which can then be removed by scrubbing as described above. None of these processes, however, are capable of efficiently producing very low levels of $NO_x$ emissions.

An alternative approach for removing NO from flue gases and other streams of pollutants is to reduce NO to nitrogen and water, which may then be discharged to the atmosphere. Reduction of $NO_x$ may be accomplished with or without catalytic assistance. Practically, the noncatalytic processes are preferable because they are not subject to the usual disadvantages of employing catalysts. Some of these additional disadvantages include higher expense associated with the catalyst, the potential of catalyst plugging, the expense and difficulty of contacting the combustion effluents with the catalyst, and the danger that the catalyst will disintegrate and be emitted into the atmosphere.

Alternatively, $NO_x$ reduction processes often teach the removal of $NO_x$ from flue gases by reduction of the NO by the addition of ammonia, urea, or ammonia precursors, alone or in combination with some other combustional material, while the waste gas is at a relatively high temperature (generally from about 700° C. to about 1200° C.).

An example of such an NO reduction process is described in U.S. Pat. No. 3,900,554 to Lyon, issued Aug. 19, 1975, entitled "Method for the Reduction of the Concentration of NO in Combustion Effluents Using Ammonia." The process disclosed in that patent teaches the reduction of NO to $N_2$ by injecting ammonia under excess oxygen conditions into the combustion effluent stream at a temperature from about 870° C. to about 1100° C. If the ammonia is injected along with a second reducing agent, such as hydrogen, NO will be rejected at temperatures as low as 700° C.

A corresponding NO reduction process is described in U.S. Pat. No. 4,335,084 to Brogan, issued June 15, 1982, entitled "Method for Reducing $NO_x$ Emissions from Combustion Processes." The process disclosed in that patent is somewhat analogous to that disclosed by Lyon in that NO is reduced by a selective, noncatalytic, reaction with ammonia; however, according to the Brogan process, the reaction occurs under fuel-rich conditions and the reaction temperature window is considerably higher (1900°–3000° F.).

Recent data incidate that similar results can be achieved under both fuel-rich and fuel-lean conditions with urea injection. In U.S. Pat. No. 4,208,386 to Arand et al., issued June 17, 1980, entitled "Urea Reduction of $NO_x$ and Combustion of Effluents," a method for selectively reducing $NO_x$ in combustion effluents containing at least 0.1 volume percent oxygen at temperatures in excess of 1300° F. is described. As with the Lyon invention for ammonia, the optimum temperature window for urea injection under excess air conditions is relatively low (1300°–2000° F.).

In a subsequent U.S. Pat. No. 4,325,924, again to Arand et al., issued Apr. 20, 1982, entitled "Urea Reduction of $NO_x$ in Fuel Rich Combustion Effluents," the authors disclose the existence of a high-temperature window (1900°–3000° F.) where urea can also be used to selectively reduce $NO_x$ emissions under fuel-rich conditions.

The above-referenced material demonstrates that while $NO_x$ emissions can be selectively reduced by ammonia, ammonia producing compounds and urea, the optimum temperature appears to depend primarily on whether selective reduction reactions are being conducted under fuel-rich (high temperatures required: 1900°–3000° F.) or fuel-lean conditions (moderate temperatures: 1300°–2000° F.). However, none of the above references disclose a process for achieving very low concentrations of $NO_x$ emissions.

Another group of pollutants which are of major importance are the sulfur oxides (generally collectively designated "$SO_x$"). Sulfur oxides are primarily emitted in the form of sulfur dioxide ("$SO_2$"), with small amounts of accompanying sulfur trioxide ("$SO_3$"). Since there is no harmless gas phase sulfur species analogous to $N_2$, combustion modification has not been useful for controlling $SO_x$ emissions. Exhaust gas cleanup systems, however, including both wet scrubbing and spray drying techniques, are well known and effective.

High temperature (1800° F. to 2800° F.) injection of dry, pulverized limestone has also been used to reduce sulfur emissions. In addition, several recant investigations have shown that hydrated lime ($Ca(OH)_2$) is effective in reducing $SO_x$ emissions. None of the current literature, however, shows that dry sorbent injection can be directly combined with reducing agent injection to achieve optimum $NO_x$ and $SO_x$ control simultaneously and with relatively small capital cost. Such a process would be a major advancement in the art.

From the discussion above, it is apparent that what is currently needed in the art are methods for the selective, noncatalytic reduction of $NO_x$ which produce $NO_x$ emissions well below those obtainable using prior art methods. It would be an advancement in the art to provide such methods which employed a process which effectively produced emission levels below 100 ppm without a catalyst and using inexpensive and readily available reactants. It would be a further advancement in the art to provide methods for simultaneously controlling $NO_x$ and $SO_x$ emissions.

Such methods are disclosed and claimed below.

BRIEF SUMMARY AND OBJECTS OF THE INVENTION

The present invention relates to methods for selectively reducing $NO_x$ so that nitrogen oxides can be removed from emission effluent streams and $NO_x$ emissions can be reduced to very low levels. In addition, the present invention teaches a method whereby $NO_x$ and $SO_x$ may be simultaneously removed from the effluent stream.

The present invention teaches the reduction of $NO_x$ with $NH_3$, urea, and related compounds. Contrary to the teachings of the existing literature, however, the present invention teaches a two-step reaction process under carefully controlled conditions for reducing $NO_x$ to very low levels.

Initially, the selective reducing agent (such as ammonium sulfate or urea) is decomposed. It is presently believed that this decomposition forms $NH_2$ radicals. The reaction takes place in an oxygen-free, fuel-rich "decomposition zone." It is presently preferred that the reaction temperature in this decomposition zone be maintained in the range of from about 300° F. to about 2400° F., and preferably in the range of from about 1200° F. to about 1900° F.

It will be appreciated, furthermore, that $NO_x$ may or may not be a part of the oxygen deficient gases in the oxygen-free, fuel-rich decomposition zone. That is, the production of the reaction intermediates in the oxygen-free decomposition zone may take place within the combustion area ("combustion zone") which produces the effluents. Alternatively, reducing agent decomposition may occur at a location remote from the combustion zone in the presence of CO and water. If the second alternative is chosen, the reducing agent decomposition species will then be injected into the effluent stream at an appropriate location.

After the reducing agent is decomposed in the absence of oxygen, the decomposition stream is mixed with the effluent stream containing $NO_x$. At this point, the oxygen level of the stream must be carefully controlled to provide an excess of oxygen. It may be necessary at this point to inject air into the effluent stream in order to maintain the proper conditions for $NO_x$ reduction.

In this reduction zone, $NO_x$ reduction takes place at temperatures in the range of from approximately 500° F. to approximately 2600° F. The selective reduction of $NO_x$ in this zone is relatively fast; but residence times in excess of at least 30 milliseconds are preferred in order to assure that complete micromixing occurs.

The molar ratio of equivalent nitrogen (moles of nitrogen) in the reducing agent to nitrogen in $NO_x$ to be removed should be approximately 0.5:1 to approximately 10:1. Increasing the ratio of the reducing agent to the $NO_x$ increases the extent of $NO_x$ reaction; however, it may also increase the overall cost of the control technology and the probability of undesirable trace species produced by the reaction of the reducing agent being emitted.

The present invention can also be combined with $SO_x$ control technology. Specifically, species used to control $SO_x$ (such as limestone, dolomite, quicklime, and hydrated lime) can be added to the $NO_x$ reducing agent for injection into the effluent stream. Thus, simultaneous $NO_x$ and $SO_x$ control can be achieved.

It is, therefore, a primary object of the present invention to provide methods for reducing $NO_x$ emissions which are highly selective, noncatalytic, and which are capable of providing overall emission reductions in excess of 90% using a relatively low cost process.

It is a related object of the present invention to provide such methods which are capable of producing exhaust $NO_x$ emission levels at acceptably low levels which are significantly lower than those achieved under typical combustion conditions.

It is another object of the present invention to provide methods which are capable of simultaneously reducing emissions of both $NO_x$ and $SO_x$.

These and other objects of the invention will become apparent upon reading the following detailed description and appended claims, and upon reference to the appended drawings.

DETAILED DESCRIPTION OF THE PREFERRED EMBODIMENTS

I. General Description

Figure 1:
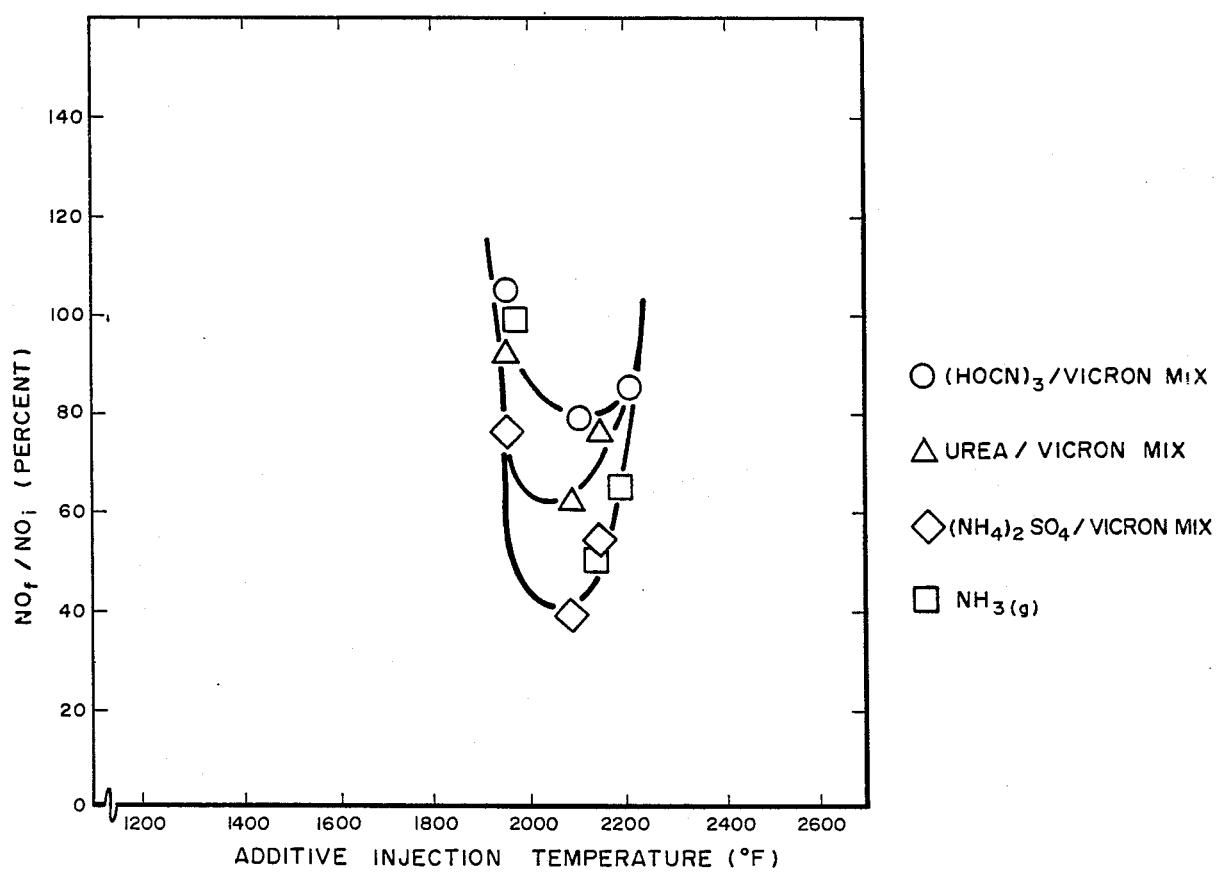
FIG. 1 is a graph which illustrates the direct application of ammonia, urea, and related compounds according to the teachings of the existing literature under fuel-lean conditions.

The present invention is related to a two-stage reaction method for reducing $NO_x$ within an effluent stream using —NH or —CN decomposition products. The effluent stream may originate with a fixed facility such as a boiler, refinery heater, industrial furnace, gas turbine, municipal waste incinerator, or internal combustion engine, or with a mobile source such as a gasoline or diesel engine in a motor vehicle.

The present invention provides an extremely effective method of eliminating $NO_x$ pollutants. $NO_x$ pollutants can be reduced by more than approximately 90 percent, thereby producing exhaust $NO_x$ emission levels, under typical conditions, significantly below 100 ppm.

As mentioned above, the present invention operates by the use of an amine, or cyano containing selective reducing agent such as ammonium sulfate, urea, or melamine. Other potentially useful compounds include such species as ammonium carbonate, ammonium bicarbonate, ammonium formate, ammonium oxalate, ammonia, biuret, triuret, $NH_2$ CN, $Ca(CN)_2$, $CaCN_2$, NaOCN, and dicyanodiamide.

Under the methods are known in the art, urea, ammonia, and ammonia salts are known to be useful as $NO_x$ reducing agents at temperatures between 1300° and 2000° F. for fuel-lean injection and at temperatures from 1900° to 3000° F. for fuel-rich injection. However, the existing art does not teach that reductions can be achieved with low temperature, fuel-rich injection and it is incapable of producing emission levels significantly below 100 ppm. Indeed, current commercial practice is to employ selective high cost catalytic reduction processes when extremely low emission levels are required. The present invention overcomes the obstacles previously encountered when applying the prior art to actual practice.

In the first reaction zone of the present invention, the selective reducing agent is decomposed. As mentioned above, this reaction zone can be referred to generally as the "decomposition zone" and may be within the combustion zone which produces the $NO_x$ emissions, or may be separate. Decomposition of the selective reducing agent is necessary in order to provide appropriate species which are effective for $NO_x$ reduction.

It is presently believed that the selective reducing agent proceeds by the following general reactions:

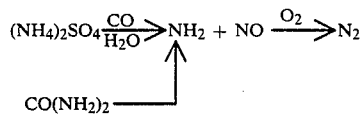

While the details of the decomposition process have not been fully characterized at the present time, it appears likely that NH and $NH_2$ are key intermediate species. For clarity of discussion, the reaction mechanism shown above is discussed; however, this proposed mechanism is not intended to limit the scope of the present invention.

The decomposition of the reducing agent must take place in a fuel-rich environment; thus, the decomposition can take place within the combustion effluent stream at a point where oxygen is deficient and the primary gas phase species are CO, $CO_2$, $N_2$, and $H_2O$. In the alternative, the decomposition of the reducing agent may take place in a separate, oxygen-free decomposition zone, probably containing CO and $H_2O$, but apart from the $NO_x$ containing effluent stream. The reducing agent may be injected in any of a number of forms. For example, a dry solid powder, an aqueous solution, a slurry, or an alcoholic solution have all been found to be acceptable.

The decomposition must take place at somewhat elevated temperatures. It is presently preferred that the decomposition take place at temperatures between approximately 300° F. and approximately 2400° F. More specifically, it is presently preferred that the decomposition of reducing agent take place at temperatures from about 1200° F. to about 1900° F.

The time which the reducing agent spends within the decomposition zone should be sufficient to allow at least partial decomposition of the reducing agent species. The reaction time within this zone is preferably from approximately 0.005 seconds to approximately 5.0 seconds. More preferably, the time within the decomposition zone is from approximately 0.03 seconds to approximately 2.0 seconds.

Once the reducing agent is decomposed it may be introduced into the effluent stream in order to accomplish complete reduction of the $NO_x$ species within the stream. This second reaction zone must be at a location in the effluent stream which is oxygen rich.

The temperature within the reaction zone is preferably maintained between approximately 500° F. and approximately 2600° F. More preferably the temperature within the reaction zone should be maintained within the range of approximately 800° F. to approximately 2400° F.

The selective reduction of $NO_x$ by the decomposition product species occurs at a relatively fast pace. In order to assure complete reaction of the species, however, residence times from approximately 30 milliseconds to approximately 5.0 seconds are required. More preferably reaction times within the range of approximately 100 milliseconds to approximately 2.0 seconds are required.

It will be appreciated that under certain circumstances it may be desirable to enhance the effectiveness of the reaction zone by the addition of one or more reaction enhancers. These may include, for example, radical generating promoters such as hydrogen, methanol, natural gas, propane, carbon monoxide, and light petroleum fuels. The additional species may also include catalysts such as stainless steel, palladium, platinum, tungsten, nickel, cobalt, gold, silver, and manganese.

It is presently preferred that the molar ratio of equivalent nitrogen ("moles of N") in the reducing agent to the moles of N in the $NO_x$ to be removed should be in the range of from 0.5:1 to about 10:1. More specifically, the range of from about 0.7:1 to about 3:1 is preferred. Increasing the ratio of reducing agent to the $NO_x$ increases the extent of $NO_x$ reduction; however, it also increases the overall cost of the control technology, as well as the probability of additional undesired species being emitted.

It is also presently preferred that the air/fuel stoichiometric ratio within the decomposition zone be maintained with certain ranges. Air/fuel ratios within the range of about 0.7 to 1.0 are found acceptable, with the most preferred range being from about 0.9 to about 1.0.

In addition to providing $NO_x$ reduction, the present invention can also be used in conjunction with $SO_x$ control. As was mentioned above, injection of dry, pulverized limestone at temperatures from approximately 1800° F. to approximately 2800° F. can be used to reduce sulfur emissions. In addition, hydrated lime ("$Ca(OH)_2$") is more effective than either the raw limestone or intermediate reactant CaO.

Thus, it is within the scope of the present invention to inject a dry sorbent, (such as hydrated lime) in conjunction with the injection of the $NO_x$ reducing agent or its decomposition products. Therefore, sulfur reduction technology can easily be combined with the present invention in order to simultaneously reduce $NO_x$ and $SO_x$ emissions.

II. Experimental Results

As noted briefly above, the existing literature reports that ammonia, ammonia salts, and urea can be used to reduce $NO_x$ emissions under excess air conditions at moderate temperatures. FIG. 1 is a graphical representations of data obtained using the process described by Lyon for $NH_3$ and by Arand et al. for urea.

The data set forth in FIG. 1 were obtained in a six-inch diameter refractory lined furnace where the primary combustion zone was fired with natural gas at a firing rate of 50,000 BTU/hour. The gas phase NO concentration prior to the injection of the reducing agent ("$NO_i$") was 240 ppm. Ammonia was added in the form of a pure gas; the other compounds were added in the form of a dry powder mixed with an inert, limestone, to facilitate feeding. In each instance the nitrogen in the reducing agent was 1.5 times the molar nitrogen present as NO.

The data are presented with the vertical axis showing the ratio of final NO ("$(NO)_f$") to initial NO ("$NO_i$"). The horizontal axis represents injection temperature of the nitrogen reducing agent into the refractory-lined furnace.

The data shown on FIG. 1 indicates that $NO_x$ reductions can be achieved using the process described by Lyon and Arand et al. Because this furnace is not an isothermal reactor, but rather the temperature is falling at approximately 700° F./second, the actual reduction temperature is always slightly lower than the apparent temperature at the point of injection. Thus, an optimum injection temperature of approximately 2100° F. corresponds to an actual reaction temperature of 1800° F. to 1900° F.

With further reference to FIG. 1, a stoichiometric ration ("SR") of 1.25 existed and indicates that 25% excess oxygen was present in the flue gas. Significant NO reductions were achieved with all of the compounds tested and the dependence with respect to temperature was similar for urea and the ammonia compounds. The best performance was achieved with ammonia and ammonium salts.

Figure 2:
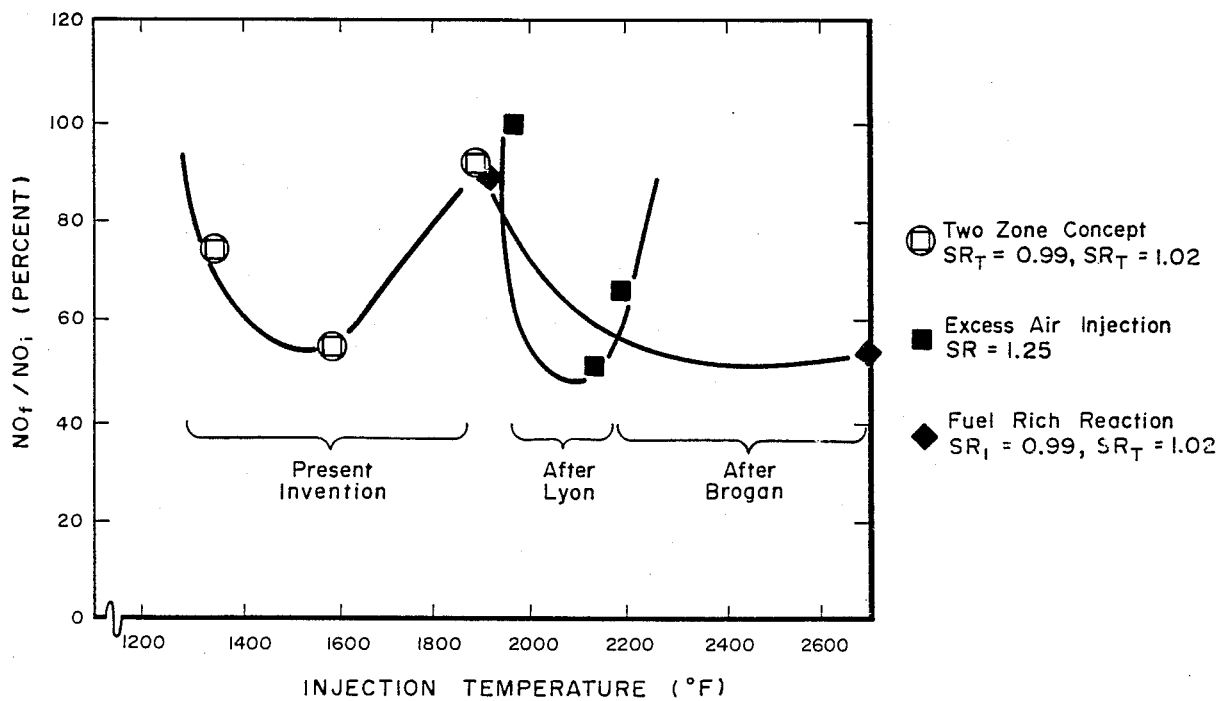
FIG. 2 is a graph which illustrates the selective reduction of $NO_x$ emissions with $NH_3$ injection under the mechanisms taught by Lyon (solid squares), and Brogan (solid diamonds) as compared to the 2-zone method of the present invention (open circles).

FIG. 2 illustrates results obtained with the two zone concept of this invention relative to ammonia injection using the existing art. In the the two-zone experiments, the $NH_3$ was injected at 1900° F. and the temperature of the secondary air addition point was progressively decreased. These results clearly indicate that there exists a third regime not disclosed in the previous art where $NH_3$ can be injected under fuel-rich conditions and caused to decompose to produce intermediate species which are more effective than those produced by direct injection at higher temperatures under either fuel-rich or fuel-lean conditions.

Figure 3:
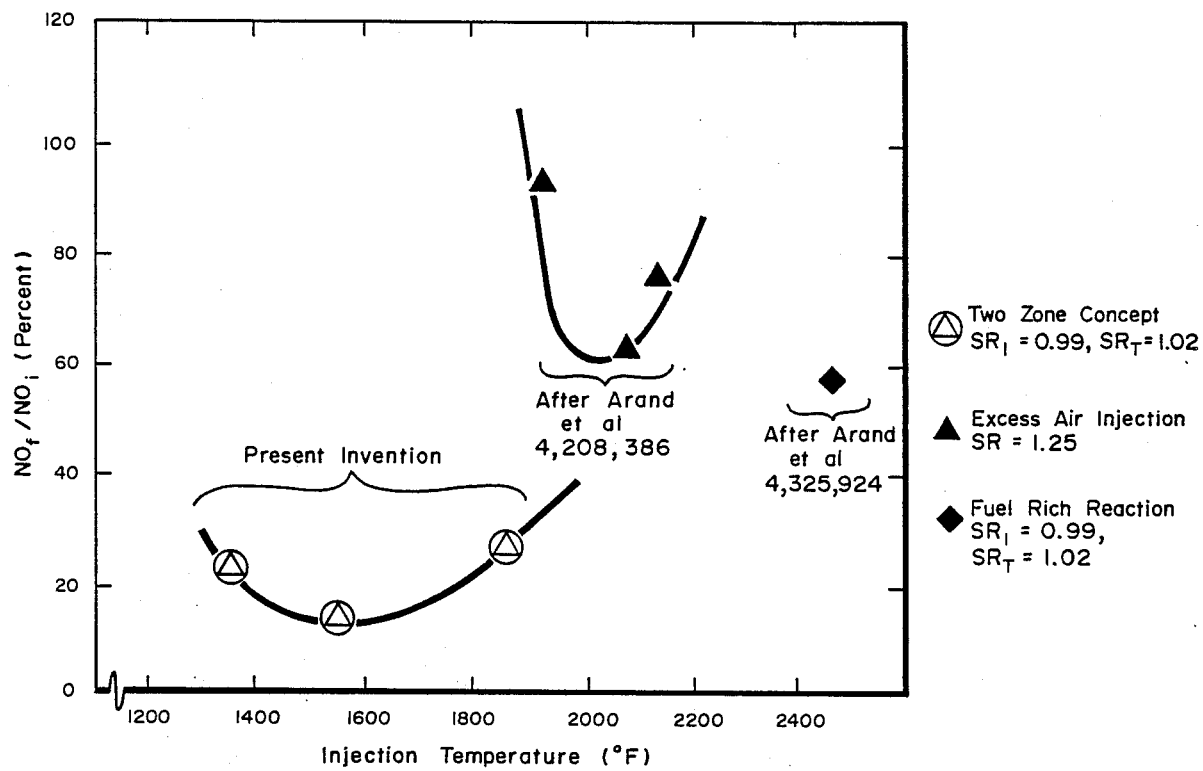
FIG. 3 is a graph which illustrates the selective reduction of $NO_x$ emissions using urea injection under the mechanism taught by Arand et al. (solid symbols) under both fuel-rich and fuel-lean conditions compared to the 2-zone method of the present invention (open symbols).

FIG. 3 shows the results of an analogous set of experiments to those shown in FIG. 2. Again these experiments use the 50,000 BTU/hr. refractory-lined furnace but with urea injection. The solid symbols indicate the existing the art with high temperature urea injection under fuel-rich conditions and medium temperature urea injection under fuel-lean conditions as described by Arand et al.

FIG. 3 also shows data obtained with urea injection using the two zone concept of the present invention. The results using the present invention illustrate dramatically that significantly lower $NO_x$ levels can be achieved using the two zone concept with controlled stoichiometry than with either the fuel-lean or fuel-rich injection of the schemes of the existing art. In addition, a far broader temperature window of acceptable performance exists for the process of the present invention as shown in FIG. 3.

The results shown in FIG. 3 indicate that the optimum urea decomposition zone temperatures are less than 1900° F. and the optimum selective $NO_x$ reduction temperature is between approximately 1400° F. and approximately 1800° F. for the particular residence time, stoichiometry, and temperature profile used in these experiments. The residence times used in these experiments were from about 0.01 seconds to about 1.0 seconds for the urea decomposition zone and from about 0.1 seconds to about 2.0 seconds for the selective $NO_x$ reaction zone.

Figure 4:
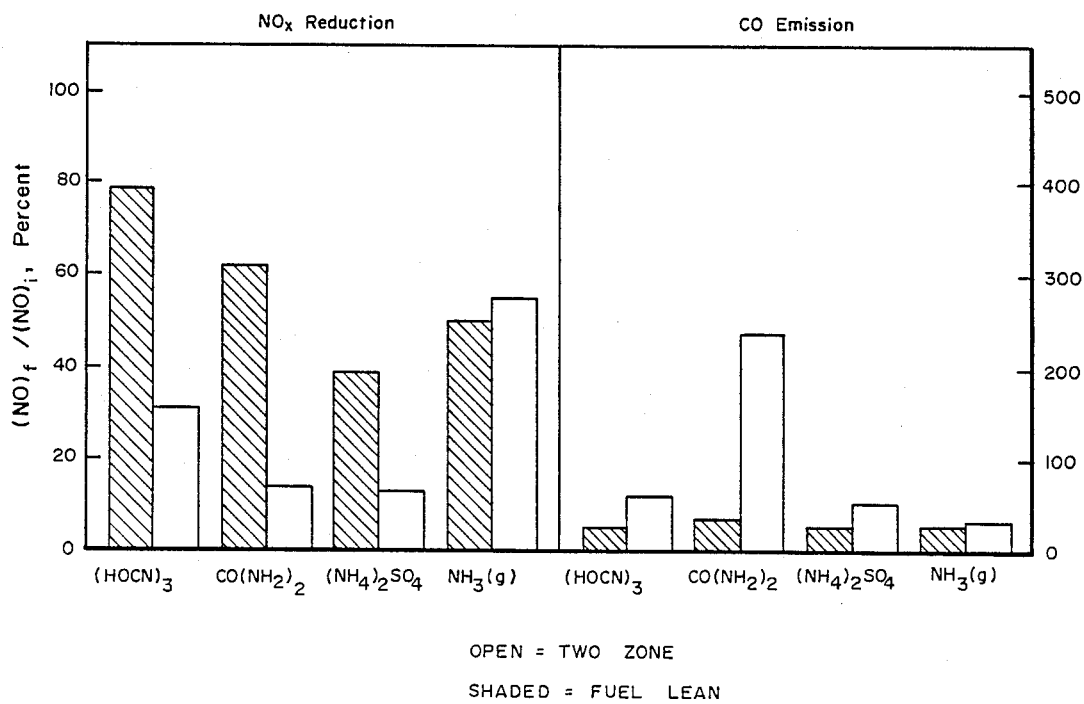
FIG. 4 is a graph which summarizes the influence of various NH and CN compounds on $NO_x$ emissions and CO emissions using the 2-zone method of the present invention.

FIG. 4 summarizes the optimum results obtained with the two zone concept of the present invention. These data were again obtained in the six-inch diameter refractory-lined tunnel furnace with an initial NO concentration of 240 ppm. The selective reducing agent was injected at a rate to provide a molar equivalent nitrogen ratio of 1.5 times the inlet NO. The stoichiometry in the decomposition zone was maintained at 0.99 and the overall stoichiometry, after the addition of the final burn out air in the reaction zone was maintained at 1.02 for the two zone process (open bars). The shaded bars indicate the NO reduction achieved with fuel-lean injection according to the existing art.

These data demonstrate that in the case of the solid materials (urea and ammonium sulfate), the NO reduction using the two zone process of this invention greatly exceeds that possible with the previous art under the conditions tested.

Figure 5:
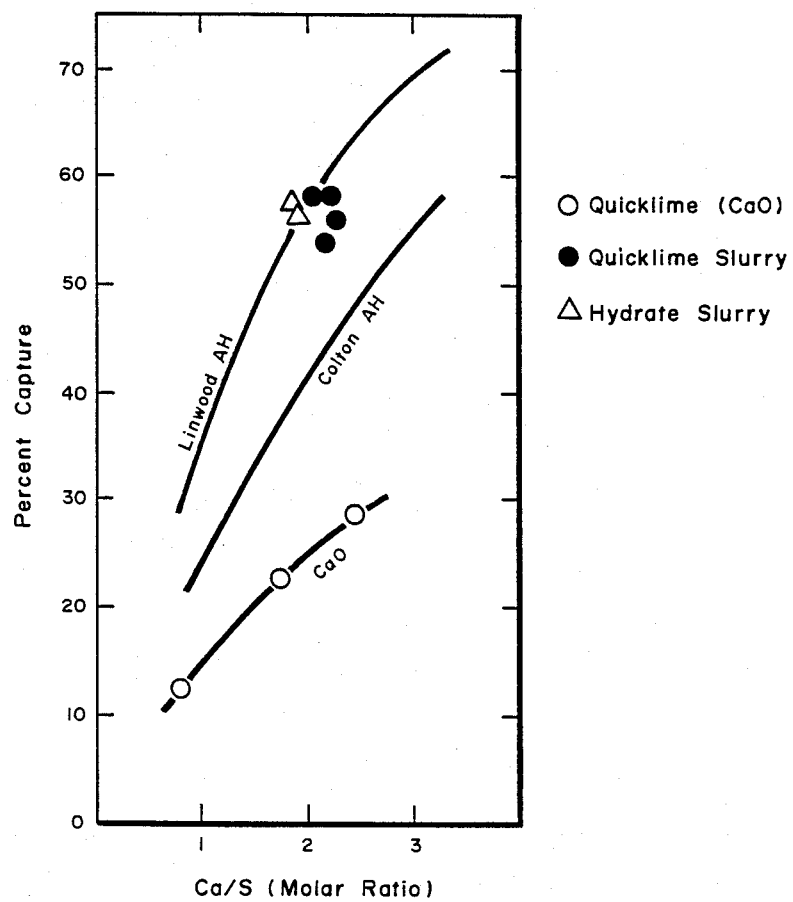
FIG. 5 is a graph which illustrates the $SO_2$ capture which can be achieved with the CaO-slurry of this invention relative to the capture achieved with hydrated limes and raw CaO.

FIG. 5 shows the results of testing using various $SO_2$ control concepts. The solid lines indicate typical performance by high and low efficiency atmospheric hydrates (Linwood and Colton respectively) and commercially produced lime (CaO). FIG. 5 also shows data for a hydrate slurry (triangles) which resulted in essentially the same sulfur capture as was achieved with the hydrate alone. More importantly, however, FIG. 5 illustrates data obtained with a quicklime slurry which indicate that very high capture levels can be achieved by simply slurrying commercial CaO and injecting the slurry under normal conditions at approximately 2300° F. These data suggest that it is not necessary to externally hydrate the sorbent and dry it; the performance of the quicklime slurry is equivalent to that of the best commercial hydrate.

The experimental data presented above clearly indicate that using the two stage mechanism described above, very high levels of $NO_x$ control can be achieved. At the same time, if the $NO_x$ reducing agent is injected along with CaO or other sorbents, corresponding high levels of $SO_x$ control can be achieved. As a result, the present invention provides a clear advancement in the control of $NO_x$ and $SO_x$ emissions.

III. EXAMPLES OF PREFERRED EMBODIMENTS OF THE PRESENT INVENTION

The following examples are given to illustrate the process of the present invention, but the examples are not intended to limit the scope of the present invention.

EXAMPLE 1

In this example, a 6 inch diameter refractor lined furnace was used and was fired by natural gas at a firing rate of 50,000 BTU/hour. The gas phase NO concentration prior to urea injection was about 240 ppm. Urea was injected into the furnace as a dry powder mixed with an inert substance (i.e., limestone) to facilitate handling.

The ratio of injected urea to NO in the combustion effluents was 1.5. The stoichiometric ratio within the furnace was approximately 1.25. That is, the furnace was operated so as to produce combustion effluents in which 25% excess $O_2$ was present. Urea was injected in the absence of $O_2$ at temperatures at about 2000° F.

Under these conditions, about 40% reduction on NO was observed. This illustrates the fact that the injection of urea into combustion effluents in the presence of oxygen at moderate temperatures can produce some $NO_x$ reduction as described in the existing art. Exhaust concentrations dramatically below 100 ppm are, however, not achieved under these conditions.

EXAMPLE 2

In Example 2, the same facility as set forth in Example 1 was used. The nitrogen equivalent in the added urea was again 1.5 times the inlet NO which was 240 ppm.

In this example the urea was injected into an oxygen deficient zone with an overall stoichiometry of 0.99. The bulk gas temperature at the point of injectio was about 2450° F. The urea was allowed to selectively react with the NO during a residence time of approximately 300 milliseconds ("ms") after which additional air was added to bring the overall stoichiometry up to 1.02. The temperature at which the final burnout air was added was approximately 2250° F.

Using these conditions, approximately 30% reduction of NO was observed. The final NO concentration was about 175 ppm. This illustrates the fact that injection of urea into a high temperature, fuel-rich zone can produce some selective reduction as described in the prior art, however, exhaust concentrations below 100 ppm are not achieved under these conditions.

EXAMPLE 3

In this example the same facility as that set forth in Example 1 was used. The gas phase NO concentration prior to urea injection was about 240 ppm and the nitrogen equivalent in the added urea was about 1.5 times the inlet NO.

In this example the urea was decomposed in an oxygen deficient zone with an overall stoichiometry of 0.99. The reaction of the urea decomposition products and NO was allowed to occur subsequently in a downstream zone with an overall stoichiometry of 1.02. The temperature at the point of urea injection in the decomposition zone was approximately 1870° F. and the temperature in the reaction zone after the addition of the final burnout air was about 1550° F.

Under these conditions about 80% reduction of NO was observed. Final NO concentration was about 45 ppm. This example demonstrates that the use of the two zone concept with low temperature injection into an oxygen deficient zone can produce remarkably higher reduction efficiencies than high temperature, fuel-rich injection (Example 2) or direct excess air injection (Example 1).

EXAMPLE 4

In this example the same facility and reaction conditions as set forth in Example 3 were used. In this example, however, ammonia gas was added instead of urea and the nitrogen equivalent in the ammonia was 1.5 times the inlet NO.

In this example the ammonia was decomposed in an oxygen deficient zone with an overall stoichiometry of 0.99. The reaction of the ammonia decomposition products and NO was allowed to occur subsequently in a downstream zone with an overall stoichiometry of 1.02. The temperature at the point of NH$_3$ injection and decomposition was held at about 1900° F. and the temperature at the beginning of the reaction zone where the final burnout air was added was about 1550° F. The concentration of NO following the selective reaction zone was 120 ppm corresponding to a 50% overall reduction.

This example demonstrates that good NO$_x$ reduction efficiencies can be achieved using ammonia gas as a selective reducing agent with the two zone process of the present invention.

EXAMPLE 5

In Example 5, the same facility and reaction conditions as set forth in Example 1 were used. Ammonium sulfate was added to provide the nitrogen equivalent of about 1.5 times the inlet NO.

In this example the ammonium sulfate was added under excess air conditions at a temperature of approximately 2100° F. The overall stoichiometry was 1.25 corresponding to 25% excess O$_2$. The ammonium sulfate was allowed to decompose and selectively reduce the NO$_x$, both under excess oxygen conditions. The concentration of NO$_x$ following the reaction was about 95 ppm.

This example demonstrates that ammonium sulfate can be used to produce significant NO$_x$ reduction under excess air conditions according to the existing art; however, the temperature window at which this occurs is extremely narrow. In this example increasing or decreasing the temperature by as little as 150° F. resulted in an emissions increase from 95 ppm to approximately 180 ppm.

EXAMPLE 6

In Example 6, the same facility and reaction conditions as set forth in Example 3 were used. Ammonium sulfate was added at a flow rate to provide the nitrogen eqivalent of 1.5 times the inlet NO.

In this example the ammonium sulfate was decomposed in an oxygen deficient zone with an overall stoichiometry of 0.99. The reaction of the ammonium sulfate decomposition products and NO was allowed to occur subsequently in a downstream zone with an overall stoichiometry of 1.02. The temperature at the point of ammonium sulfate injection in the decomposition zone was held at about 1870° F. and the temperature at the beginning of the reaction zone where the final burnout air was added was about 1560° F.

Using these conditions about 85% reduction of NO was observed. The final NO concentration was about 34 ppm. This example demonstrates that extremely high reduction efficiencies can be achieved using the two zone process of this invention in conjunction with a solid —NH containing salt.

EXAMPLE 7

In Example 7, the same facility and reaction conditions as set forth in Example 6 were used. Ammonium sulfate was added to provide a nitrogen equivalent of about 1.5 times the inlet NO.

In this example the ammonium sulfate was added to an oxygen deficient zone with an overall stoichiometry of 0.99. In this instance both the ammonium su'f$_7$te and the final burnout air (tertiary air) were added at ... temperature of about 1850° F. The final burnout air increased the overall stoichiometry to 1.02. The concentration of NO$_x$ in the exhaust was 35 ppm corresponding an overall reduction of approximately 85%.

This example demonstrates that remarkable reduction efficiencies can be achieved using the two zone process where the selective reducing agent is added into the fuel-rich zone simultaneously with the final burnout air.

EXAMPLE 8

Data were obtained using a six-inch diameter refractory-lined furnace where the primary combustion zone was fired with natural gas at a firing rate of 50,000 BTU/hr. The gas phase NO concentration in the primary zone was 80 ppm.

An initial, oxygen-free zone was maintained, the stoichiometric ratio being 0.90. Urea was injected into this initial, oxygen-free zone at a temperature of approximately 1870° F. The urea was allowed to decompose in this zone for approximately 0.15 seconds.

Subsequently, air containing NO was added to the stream from the decomposition zone. The NO concentration in the air stream was the equivalent of 160 ppm so that the total available NO was 240 ppm. The temperature of the bulk gas at the point of air/NO injection was 1550° F.

Under these conditions it was found that the concentration of $NO_x$ in the exhaust was approximately 66 ppm. These results demonstrate that the selective reducing agent can be decomposed in a fuel-rich, moderate temperature decomposition zone fully separate from the $NO_x$ to be reduced and then the decomposition products can be added to the stream containing the NO.

EXAMPLE 9

Data were obtained using a six-inch diameter refractory-lined furnace with a primary combustion zone fired with natural gas at a firing rate of 50,000 BTU/hour. The gas phase NO concentration prior to ammonium sulfate injection was 240 ppm. The nitrogen equivalent in the ammonium sulfate was 1.5 times the inlet NO.

An initial oxygen-free zone was maintained, the stoichiometric ratio of this zone being 0.95. Ammonium sulfate was injected at approximately 1900° F. as a dry solid and allowed to decompose.

Subsequently, air was added to the reactants to bring the stoichiometric ratio up to 1.05. The temperature at the air injection point was approximately 1600° F.

Under these conditions it was found that the concentration of $NO_x$ was reduced from an initial concentration of 240 ppm to a final concentration of 100 ppm. This example illustrate that significant reductions can be achieved using the two zone concept of this invention at non-optimum stoichiometric ratios.

EXAMPLE 10

Data were obtained using an eight-inch diameter refractory-lined furnace where the primary combustion zone was fired with Illinois coal at a firing rate of 50,000 BTU/hour. Commercial quicklime (CaO) was injected as a dry powder at a flow rate to provide a $Ca/SO_2$ molar ratio equivalent to about 2.0. The dry quicklime was injected at approximately 2300° F. and the overall stoichiometry was maintained at approximately 1.25.

Under these conditions it was found that the concentration of $SO_2$ in the exhaust was reduced by approximately 22%. These results show that relatively poor $SO_2$ capture efficiencies are achieved using commercial quicklime.

EXAMPLE 11

Data were obtained using the same facility and reaction conditions as set forth in Example 10. In this instance a slurry prepared by mixing the commercial quicklime with water was injected at 2300° F. with a calcium content equivalent to $Ca/SO_2$ ratio of 2.0.

Under these conditions it was found that the concentration of $SO_2$ in the exhaust was reduced by almost 60%. These data show that remarkably higher sulfur capture efficiencies can be achieved using commercial quicklime with slurry injection than with dry powder injection.

EXAMPLE 12

Data are obtained using a 500 MW pulverized coal fired boiler where the primary combustion zone is fired with a high sulfur midwestern bituminous coal. The primary zone in the lower furnace is fired under normal combustion conditions with excess oxygen corresponding to an overall stoichiometry of 1.05. Natural gas is injected above the primary combustion zone to reduce the overall stoichiometry to 0.97. Subsequently a CaO slurry containing calcium equivalent to a $Ca/SO_2$ ratio of 2.5 is injected at 2200° F. Further downstream the final burnout air is added in the progressively staged manner. The initial air fraction includes an ammonium sulfate solution with a nitrogen content equivalent to 2.0 times the $NO_x$. This first airstream is injected at 1850° F. and is at the flow rate required to increase the overall stoichiometry to 1.02. Approximately 100 ms later the final remaining burnout air is added to raise the overall stoichiometry to 1.2.

Under these conditions it is found that the concentration of $NO_x$ is reduced from an uncontrolled concentration of 550 ppm to a final concentration of 40 ppm. The $SO_2$ concentration is reduced from an initial concentration of 4000 ppm to 1500 ppm.

EXAMPLE 13

Data are obtained using a large grate-fired incinerator which is charged with municipal solid waste at a rate of 1800 tons/day. The overall stoichiometry in the primary combustion zone corresponds to 1.5 (50% excess oxygen).

Ammonium sulfate is decomposed in a separate chamber by passing fuel-rich combustion products from a separate natural gas fired flame through a bed of ammonium sulfate. The temperature of this bed is maintained at 1900° F. and the nominal stoichiometry of the fuel-rich products is 0.99. The effluent from this decomposition zone is injected into the exhaust gas stream from the municipal waste incinerator at a temperature of 1600° F. The equivalent nitrogen flow rate in the ammonium sulfate decomposition products is maintained at 3.0 times the $NO_x$ flow from the incinerator.

Under these conditions it is found that the concentration of $NO_x$ is reduced from an initial concentration of 900 ppm to a final concentration of 300 ppm.

EXAMPLE 14

Data are obtained using a 350 cubic inch V8 engine where the engine is fueled with gasoline. The engine is tuned such that the stoichiometry in the combustion zone is 0.98. The combustion products flow from the engine at approximately 900° F. and enter a decomposition zone where urea is being decomposed by contacting with the oxygen deficient combustion products.

Subsequently, final burnout air is added to produce a slight excess of oxygen corresponding to a stoichiometric ratio of 1.01. Under these conditions it is found that the concentration of $NO_x$ is reduced from an initial concentration of 3000 ppm to a final concentration of 500 ppm when the urea decomposition rate corresponds to an equivalent nitrogen to NO flow of 3.0.

EXAMPLE 15

Data are obtained using a 300 foot long, 10 foot diameter cement kiln being fired with low sulfur western bituminous coal. The gas phase NO concentration in the exhaust prior to the application of ammonium sulfate injection is 800 ppm.

The coal fired primary zone is operated under normal conditions with 1.5% excess oxygen. Approximately 30 feet from the end of the kiln natural gas is added to reduce the overall stoichiometric ratio to 0.99. Approximately 15 feet from the end of the kiln at a temperature of 1000° F. ammonium sulfate is added with the final burnout air so that the overall exhaust oxygen concentration is 2.0%. The ammonium sulfate is fed at a rate sufficient to provide an equivalent nitrogen flow of 3.0 times the uncontrolled $NO_x$ emissions.

Under these conditions it is found that the concentration of $NO_x$ is reduced from initial concentrate of 600 ppm to final concentration of 180 ppm.

IV. Summary

In summary, it can be seen that using the two zone reaction method of introducing selective $NO_x$ reducing agents into an effluent stream provides extremely favorable results. In particular, $NO_x$ emissions can be reduced in excess of 90% with total $NO_x$ emissions being below 100 ppm. The present invention has potential for use in controlling emissions from numerous types of combustion emission sources including stationary boilers and the like, as well as motor vehicles.

The present invention provides that —NH and —CN containing selective reducing agents are decomposed into certain decomposition products in an oxygen-free zone containing CO as the result of fuel-rich combustion processes. This zone is maintained at a temperature of from about 300° F. to 2400° F. Once the decomposition of the selective agent is at least partially complete, the decomposition products are introduced into a second reaction zone having an excess of oxygen. The temperature within this zone is maintained at between approximately 500° F. and approximately 2600° F.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of eqivalency of the claims are to be embraced within their scope.

What is claimed and desired to be secured by United States Letters Patent is:

1. A process for selectively reducing nitrogen oxides in combustion effluent streams, comprising the steps of:
   (a) introducing a reducing agent into a gaseous decomposition zone, said reducing agent having at least one functional group selected from the group comprising —NH and —CN, wherein the decomposition zone is substantially oxygen deficient and is maintained at a temperature in the range of from approximately 300° F. to approximately 2400° F.;
   (b) introducing the resulting mixture from the decomposition zone to a reaction zone containing combustion effluents, said reaction zone having an excess of oxygen; and
   (c) allowing the mixture from the decomposition zone sufficient residence time within the reaction zone to allow the reduction of the $NO_x$ within the combustion effluents.

2. A process for selectively reducing nitrogen oxides in combustion effluent streams as defined in claim 1 wherein the selective reducing agent is urea.

3. A process for selectively reducing nitrogen oxides in combustion effluent streams as defined in claim 1 wherein the selective reducing agent is a compound selected from the group consisting of ammonium sulfate, ammonium carbonate, ammonium bicarbonate, ammonium formate, ammonium oxalate, ammonia, biuret, triuret, $NH_2CN$, $Ca(CN)_2$, $CaCN_2$, $NaOCN$, dicyanodiamide, and melamine.

4. A process for selectively reducing nitrogen oxides in combustion effluent streams as defined in claim 1 wherein the temperature within the decomposition zone is within the range of from approximately 1200° F. to approximately 1900° F.

5. A process for selectively reducing nitrogen oxides in combustion effluent streams as defined in claim 1 wherein the temperature within the reaction zone is within the range of from approximately 500° F. to approximately 2600° F.

6. A process for selectively reducing nitrogen oxides in combustion effluent streams as defined in claim 1 wherein the temperature in the reaction zone is maintained in the range of from approximately 800° F. to approximately 2400° F.

7. A process for selectively reducing nitrogen oxides in combustion effluent streams as defined in claim 1 wherein the residence time within the decomposition zone is about 5 milliseconds to about 5 seconds.

8. A process for selectively reducing nitrogen oxides in combustion effluent streams as defined in claim 1 wherein the fuel-rich decomposition zone is created by adding less than the stoichiometric requirement of oxygen to the combustion zone.

9. A process for selectively reducing nitrogen oxides emission in combustion effluent streams as defined in claim 1 wherein the fuel-rich decomposition zone is produced by using fuel injection.

10. A process for selectively reducing nitrogen oxides emission in combustion effluent streams as defined in claim 1 wherein the decomposition zone is at a location remote from the combustion zone and the effluent from the decomposition zone is injected into the oxygen containing combustion effluent at the inlet of the reaction zone.

11. A process for selectively reducing nitrogen oxides in combustion effluent streams as defined in claim 1 wherein the excess of oxygen within the reaction zone is achieved by the injection of a gas containing oxygen into the decomposition zone.

12. A process for selectively reducing nitrogen oxides in combustion effluent streams as defined in claim 1 wherein the equivalent mole ratio of nitrogen in the reducing agent to $NO_x$ in the combustion effluent stream is in the range of from approximately 0.5:1 to approximately 10:1.

13. A process for selectively reducing nitrogen oxides as defined in claim 1 wherein the equivalent mole ratio of nitrogen in the reducing agent to $NO_x$ is in the range of from approximately 0.7:1 to approximately 3:1.

14. A process for selectively reducing nitrogen oxides in combustion effluent streams as defined in claim 1 wherein the air to fuel stoichiometric ratio in the decomposition zone is within the range of approximately 0.7 to approximately 1.0.

15. A process for selectively reducing nitrogen oxides in combustion effluent streams as defined in claim 14 wherein the air to fuel stoichiometric ratio in the decomposition zone is within the range of from approximately 0.9 to approximately 1.0.

16. A process for selectively reducing nitrogen oxides in combustion effluent streams as defined in claim 1 wherein the reducing agent is introduced into the decomposition zone as a dry solid.

17. A process for selectively reducing nitrogen oxides in combustion effluent streams as defined in claim 1 wherein the reducing agent is introduced into the decomposition zone as an aqueous solution.

18. A process for selectively reducing nitrogen oxides in combustion effluent streams as defined in claim 1 wherein the reducing agent is injected into the decomposition zone as an alcoholic solution.

19. A process for selectively reducing nitrogen oxides in combustion effluent streams as defined in claim 11 wherein the reducing agent is injected simultaneously with the injected oxygen.

20. A process for selectively reducing nitrogen oxides in combustion effluent streams as defined in claim 19 wherein the reducing agent and the oxygen are injected above the combustion zone.

21. A process for selectively reducing nitrogen oxides in combustions effluent streams as defined in claim 1 wherein the effectiveness of the reaction zone is enhanced by the addition of a radical generating promoter selected from the group consisting of hydrogen, methanol, natural gas, propane, carbon monoxide, and light petroleum fuels.

22. A process for selectively reducing nitrogen oxides in combustion effluent streams as defined in claim 1 wherein the effectiveness of the reaction zone is enhanced by the use of a catalyst selected from the group consisting of stainless steel, Pt, Pd, W, Ni, Co, Au, Ag, and Mn.

23. A process for reducing $NO_x$ in a combustion effluent stream, comprising the steps of:
(a) introducing at least one reducing agent selected from the group consisting of ammonium sulfate, ammonium formate, ammonium oxalate, ammonium carbonate, ammonia, and urea into a stream of combustion effluents, said combustion effluents being fuel-rich and containing no oxygen and having a temperature in the range of from approximately 300° F. to approximately 2400° F. such that the mole ratio of nitrogen in the reducing agent to $NO_x$ is in the range of from approximately 0.5:1 to approximately 10:1;
(b) introducing air into the combustion effluent mixture produced in step (a) so that the resulting air/fuel stoichiometry is in excess of 1.0 and the temperature is in the range of from approximate 500° F. to approximately 2600° F. and allowing the resulting mixture to react until $NO_x$ in the combustion effluent stream has been reduced.

24. A process for reducing $NO_x$ in a combustion effluent stream, comprising the steps of:
(a) introducing at least one selective reducing agent selected from the group consisting of ammonium sulfate, ammonium formate, ammonium oxalate, ammonium carbonate, ammonia, and urea into a stream of combustion effluents, said combustion effluents being fuel-rich and containing no oxygen and having a temperature of from approximately 300° F. to approximately 2400° F. such that the mole ratio of the nitrogen in the reducing agent to $NO_x$ in the combustion effluents is in the range of from approximately 0.5:1 to 10:1;
(b) simultaneously introducing additional combustion air so that the resulting mixture has an oxygen content of between approximately 0% and approximately 10% and that the resulting temperature is in the range of from approximately 500° F. to 2600° F. such that $NO_x$ in the combustion effluent stream is reduced.

25. A process for reducing $NO_x$ in a combustion effluent stream, comprising the steps of:
(a) contacting a selective reducing agent selected from the group consisting of ammonium sulfate, ammonium formate, ammonium oxalate, ammonium carbonate, ammonia, and urea with a hot, gas stream containing no oxygen and having a temperature in the range of from approximately 300° to approximately 2400° F. such that the mole ratio of nitrogen evolved relative to the $NO_x$ to be reduced is in the range of from approximately 0.5:1 to 10:1;
(b) introducing the reducing agent/hot gas mixture produced in step (a) into a stream of combustion effluents containing $NO_x$, said combustion effluents having an oxygen concentration of between approximately 0% and approximately 10% and the resulting mixture having a temperature in the range of from approximately 500° F. to approximately 2600° F. such that $NO_x$ in the combustion effluent stream is reduced.

26. A process for reducing $NO_x$ in a combustion effluent stream, comprising the steps of:
(a) introducing at least one selective reducing agent selected from the group consisting of ammonium sulfate, ammonium formate, ammonium oxalate, ammonium carbonate, ammonia, and urea into a stream of combustion effluents;
(b) simultaneously introducing fuel such that following combustion the region surrounding the reducing agent is oxygen deficient with a temperature of from approximately 300° F. to approximately 2400° F. and such that the mole ratio of the nitrogen in the reducing agent to $NO_x$ in the combustion effluents is in the range of from approximately 0.5:1 to 10:1;
(c) contacting the selective reducing agent and decomposition products with the combustion effluent stream so that the resulting mixture has an oxygen content of between approximately 0% and approximately 10% and such that the resulting temperature is in the range of from approximately 500° F. to 2600° F. such that $NO_x$ in the combustion effluent stream is reduced.

27. A process for removing $NO_x$ and $SO_x$ from a combustion effluent stream, comprising the steps of:
(a) introducing a reducing agent into a gaseous decomposition zone, said reducing agent having at least one functional group selected from the group comprising —NH and —CN, wherein the decomposition zone is substantially oxygen deficient and is maintained at a temperature in the range of from approximately 300° F. to approximately 2400° F.;
(b) introducing the resulting mixture from the decomposition zone to a reaction zone containing combustion effluents, said reaction zone having an excess of oxygen; and
(c) allowing the mixture from the decomposition zone sufficient residence time within the reaction zone to allow the reduction of the $NO_x$ within the combustion effluents.
(d) introducing an $SO_x$ removal agent into the stream of combustion effluents, said combustion effluents having a temperature in the range of from approximately 800° F. to approximately 2800° F. at the point at which the $SO_X$ removal agent is introduced;
(e) allowing the resulting mixture sufficient residence time to allow the reaction of $SO_x$ with the $SO_2$ removal agent, said residence time being in the range of from approximately 5 milliseconds to approximately 5 seconds.

28. A process for removing $NO_x$ and $SO_x$ from a combustion effluent stream as defined in claim 27 wherein the $SO_x$ removal agent is injected into the stream of combustion effluents at a point where the combustion effluents have a temperature in the range of from approximately 1800° F. to approximately 2400° F.

29. A process for removing $NO_x$ and $SO_x$ from a combustion effluent stream as defined in claim 27 wherein the $SO_x$ removal agent is injected into the stream of combustion effluents at a point where the combustion effluents have a temperature in the range of from approximately 800° F. to approximately 1400° F.

30. A process for removing $NO_x$ and $SO_x$ from a combustion effluent stream as defined in claim 27 wherein the $SO_x$ removal agent comprises a CaO slurry.

31. A process for removing $NO_x$ and $SO_x$ from a combustion effluent stream as defined in claim 30 wherein the ratio of the added calcium to the sulfur oxides in the combustion effluent stream is from about 0.5:1 to 4:1.

32. A process for removing $NO_x$ and $SO_x$ from a combustion effluent stream as defined in claim 27 wherein the air/fuel stoichiometric ratio of the combustion effluent stream is less than 1.0.

33. A process for removing $NO_x$ and $SO_x$ from a combustion effluent stream as defined in claim 27 wherein the air/fuel stoichiometric ratio is greater than 1.0.

34. A process for removing $NO_x$ and $SO_x$ from a combustion effluent streams as defined in claim 30 wherein the $NO_x$ reducing agent is added to the CaO slurry.

35. A process for removing $NO_x$ and $SO_x$ from a combustion effluent stream as defined in claim 30 wherein the $NO_x$ reducing agent and the CaO slurry are injected at separate locations.

36. A process for removing $NO_x$ and $SO_x$ from a combustion effluent stream as defined in claim 27 wherein the $SO_x$ removal agent is added as a dry powder.

37. A process for removing $NO_x$ and $SO_x$ from a combustion effluent stream as described in claim 34 wherein a combined $SO_x$ removal agent and $NO_x$ reducing agent is prepared by external hydration of CaO with water containing a selective $NO_x$ reduction agent.

38. A process for removing $NO_x$ and $SO_x$ from a combustion effluent stream, comprising the steps of:
(a) introducing a reducing agent into a gaseous decomposition zone, said reducing agent having at least one functional group selected from the group comprising —NH and —CN, wherein the decomposition zone is substantially oxygen deficient and is maintained at a temperature in the range of from approximately 300° F. to approximately 2400° F.;
(b) introducing the resulting mixture from the decomposition zone to a reaction zone containing combustion effluents, said reaction zone having an excess of oxygen;
(c) allowing the mixture from the decomposition zone sufficient residence time within the reaction zone to allow the reduction of the $NO_x$ within the combustion effluents;
(d) introducing an $SO_x$ removal agent into the stream of combustion effluents, said combustion effluents having a temperature in the range of from approximately 800° F. to approximately 2800° F. at the point at which the $SO_x$ removal agent is introduced, said $SO_x$ removal agent comprising a slurry, and said $SO_x$ removal agent being selected from the group consisting of limestone, dolomite, quicklime, and hydrated lime; and
(e) allowing the resulting mixture sufficient residence time to allow the reaction of $SO_x$ with the $SO_2$ removal agent, said residence time being in the range of from approximately 5 milliseconds to approximately 5 seconds.

39. A process for removing $NO_x$ and $SO_x$ from a combustion effluent stream as defined in claim 38 wherein the $SO_x$ removal agent is injected into the stream of combustion effluents at a point where the combustion effluents have a temperature in the range of from approximately 1800° F. to approximately 2400° F.

40. A process for removing $NO_x$ and $SO_x$ from a combustion effluent stream as defined in claim 38 wherein the $SO_x$ removal agent is injected into the stream of combustion effluents at a point where the combustion effluents have a temperature in the range of from approximately 800° F. to approximately 1400° F.

41. A process for removing $NO_x$ and $SO_x$ from a combustion effluent stream as defined in claim 38 wherein the air/fuel stoichiometric ratio of the combustion effluent stream is less than 1.0.

42. A process for removing $NO_x$ and $SO_x$ from a combustion effluent stream as defined in claim 38 wherein the air/fuel stoichioometric ratio is greater than 1.0.

43. A process for removing $NO_x$ and $SO_x$ from a combustion effluent streams as defined in claim 38 wherein the $NO_x$ reducing agent is added to the slurry including the $SO_x$ removal agent.

44. A process for removing $NO_x$ and $SO_x$ from a combustion effluent stream as defined in claim 38 wherein the $NO_x$ reducing agent and the slurry including the $SO_x$ removal agent are injected at separate locations.

45. A process for removing $NO_x$ and $SO_x$ from a combustion effluent stream as described in claim 38 wherein a surfactant is added to the slurry including the $SO_x$ removal agent in order to enhance emission reduction.

* * * * *

UNITED STATES PATENT AND TRADEMARK OFFICE
CERTIFICATE OF CORRECTION

PATENT NO. : 4,851,201
DATED : July 25, 1989
INVENTOR(S) : Michael P. Heap et al.

It is certified that error appears in the above-identified patent and that said Letters Patent is hereby corrected as shown below:

Column 8, line 23, "with" should be --within--
Column 9, line 8, "ration" should be --ratio--
Column 9, line 31, "existing the art" should be --existing art--
Column 10, line 67, "injectio" should be --injection--
Column 17, line 14, "combustions" should be --combustion--

Signed and Sealed this

Fourth Day of December, 1990

*Attest:*

HARRY F. MANBECK, JR.

*Attesting Officer*    *Commissioner of Patents and Trademarks*